United States Patent
Adleff et al.

[11] Patent Number: 5,778,668
[45] Date of Patent: Jul. 14, 1998

[54] HYDRODYNAMIC CLUTCH ARRANGEMENT IN A DRIVE SYSTEM

[75] Inventors: Kurt Adleff, Crailsheim; Gunter Schuttler, Wallhausen, both of Germany

[73] Assignee: Voith Turbo GmbH, Germany

[21] Appl. No.: 669,217

[22] Filed: Jun. 24, 1996

[30] Foreign Application Priority Data

Jun. 26, 1995 [DE] Germany ............. 195 22 753.0

[51] Int. Cl.⁶ .................................................... F16D 33/00
[52] U.S. Cl. ..................................................... 60/339
[58] Field of Search ..................................... 60/330, 339

[56] References Cited

U.S. PATENT DOCUMENTS

| | | | |
|---|---|---|---|
| 2,430,258 | 11/1947 | Thompson | 60/339 |
| 3,058,296 | 10/1962 | Mischke | 60/12 |
| 3,136,129 | 6/1964 | Lutze | 60/54 |
| 3,952,508 | 4/1976 | Bopp | 60/339 X |
| 4,376,370 | 3/1983 | Kinugasa et al. | 60/339 X |
| 4,586,337 | 5/1986 | Fox | 60/605 |
| 5,323,610 | 6/1994 | Fransson et al. | 60/339 |
| 5,352,100 | 10/1994 | Bauknecht | 60/339 X |

FOREIGN PATENT DOCUMENTS

| | | |
|---|---|---|
| 0507887 | 5/1994 | European Pat. Off. |
| 1005185 | 12/1951 | France ............. 60/339 |
| WO 86/00665 | 1/1986 | WIPO |

*Primary Examiner*—Hoang Nguyen
*Attorney, Agent, or Firm*—Baker & Daniels

[57] ABSTRACT

The present invention relates to a hydrodynamic clutch in a drive system, notably a turbo compound system. The hydrodynamic clutch includes a pump impeller and a turbine impeller which together form a toroidal working space. The turbine impeller is joined to a take-off shaft in torsionally fixed fashion and the pump impeller bears, via a bearing arrangement, on the take-off shaft. Coordinated with the toroidal working space is an operating medium supply system. The operating medium supply system includes an operating medium supply space which is arranged radially interior to the toroidal working space and bounded in the axial direction by the bearing arrangement and the contour of the turbine impeller. A central operating medium supply duct is arranged in the take-off shaft and extends in the take-off shaft in the axial direction at least up into the area of the center plane of the clutch. At least one distributing duct connects the central operating medium supply duct to the operating medium supply space.

6 Claims, 2 Drawing Sheets

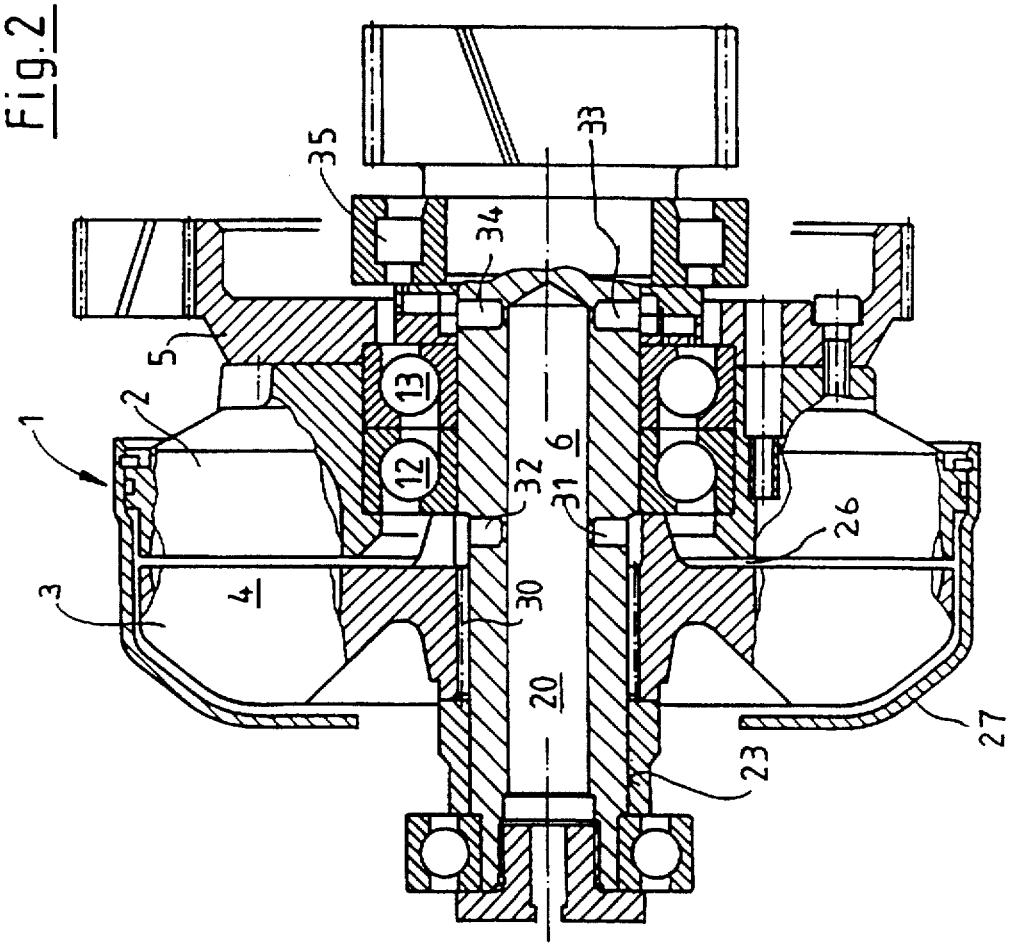

HYDRODYNAMIC CLUTCH ARRANGEMENT IN A DRIVE SYSTEM

BACKGROUND OF THE INVENTION

The invention relates to a hydrodynamic clutch in a drive system, notably a turbo compound system in which the hydrodynamic clutch includes a pump impeller and a turbine impeller torsionally fixed to a take-off shaft wherein the pump impeller and turbine impeller form a toroidal working space.

For energy reclamation from the exhaust gases of an internal combustion engine, in turbo compound systems, an exhaust gas turbocharger is provided which features a turbine powered by the engine exhaust gases and a compressor which is mechanically joined to the turbine and precompresses the combustion air required for the engine. The exhaust gases still possess a high energy content after discharge from the turbine. An option for utilizing this residual energy is to place a second turbine after the turbine of the exhaust gas turbocharger. The second turbine is driven by the exhaust gases and so arranged that part of the residual energy is mechanically transmitted to the input shaft of the internal combustion engine or a drive connected to it.

Such systems are known, for example, from the following documents:

1. U.S. Pat. No. 4,586,337
2. WO 86/00665.

Both documents show exhaust gas turbines which via a hydrodynamic clutch transmit energy reclaimed from the exhaust gases of an internal combustion engine to a control gear of the engine and provide for a decoupling of vibrations between the engine and exhaust gas turbine.

In such turbo compound systems it is important to minimize the transmission losses between the exhaust gas turbine and the crankshaft in order to make sure that the residual energy actually transmits additional drive power to the crankshaft. It is advantageous to use the lubricant of the engine as the operating medium of the hydrodynamic clutch. In this case, bearings of the hydrodynamic clutch can be simultaneously lubricated, the engine oil pump can be used for filling the hydrodynamic clutch, and, with a steady flow, the heat generated can be dissipated by the lubricant.

The main bearings of a hydrodynamic clutch support on the one end the turbine impeller and the pump impeller, and, on the other end, the stationary part of the clutch. Due to the continuous rotation, the bearings which support the turbine impeller in relation to the pump impeller are exposed only to the slip between the pump impeller and turbine impeller of the hydrodynamic clutch. Supporting the turbine impeller relative to the pump impeller, these bearing may therefore be called low-speed bearings. The bearings supporting both the pump impeller or the turbine impeller in the stationary part of the clutch are constantly stressed in rotation, notably at elevated rpm. Therefore, these bearings are called high-speed bearings. In the documents U.S. Pat. No. 3,058,296 and U.S. Pat. No. 3,136,129, both low-speed and high-speed bearings are flooded with oil/hydraulic fluid which is passed in the working space of the clutch. Therefore, very large flows are required for heat dumping, since the heat accruing in the bearings must also be dissipated.

Known from EP 0 507 887 B1 is an arrangement for an effective oil supply to a working chamber in an oil-flooded hydrodynamic clutch and for lubrication of the clutch bearings, the oil supply to which is effected through a duct in the stationary part of the clutch. This duct empties in a clutch space upstream of a first bearing which supports the pump impeller in the impeller of the clutch, with the oil proceeding after flooding of the first bearing to the working chamber of the clutch, which contains the pump impeller and the impeller wheel. For support in the housing, one of the clutch impellers has arranged in it a second bearing which via a throttle communicates with the space upstream of the first bearing, the throttle sealing against the full oil flow to the clutch, allowing only an oil quantity sufficient for flooding lubrication of the second bearing to pass. Such an arrangement is characterized by an enormous engineering expense. The one bearing is for operating medium supply flooded completely, while for the other bearing a partial flow is diverted, for lubrication, via a throttle. Owing to this arrangement and a complex routing of the operating medium supply duct, because the operating medium is routed from a stationary component to a rotating component, a number of additional sealing measures are required.

SUMMARY OF THE INVENTION

The objective underlying the present invention is to advance a hydrodynamic clutch for use in a drive system, notably a turbo compound system, to the effect that a simple operating medium supply is provided and no separate supply line is required for supplying lubricant to the bearings. The heat accruing in the clutch due to the torque transfer is supposed to be dumped without appreciable expense.

The solution according to the present invention is achieved by arranging an operating medium supply space radially interior of the toroidal working space and axially between the turbine impeller and a bearing disposed between the pump impeller and the take-off shaft. A central operating supply duct extends axially within the take-off shaft and intersects a center plane disposed between the pump impeller and the turbine impeller while at least one distributing duct located within the take-off shaft provides fluid communication between the central operating supply duct and the central operating supply space.

Support of the primary impeller, that is, the pump impeller, is provided by the take-off shaft of the clutch, to which the secondary impeller, or turbine impeller, can be joined in torsionally fixed fashion.

The support is preferably provided via a bearing arrangement comprising at least one bearing, preferably two angular ball bearings, due to their good absorption of combined loads. The angular ball bearings are arranged in pairs side by side. In the radial direction, the bearings are disposed radially interior of the working space defined by the pump impeller. In the axial direction, the bearings are preferably installed in the area of the parting plane formed by the blades of the pump impeller and turbine impeller. A central bore extending through the take-off shaft is provided for supplying operating medium, from which bore depart distributing ducts radially in the peripheral direction of the take-off shaft. In the installed position of the clutch, these distributing ducts are preferably arranged so that they are situated in the area of the parting plane between the turbine impeller and pump impeller. The distributing ducts empty into a supply space defined by the pump impeller and turbine impeller and preceding the toroidal working space. As previously mentioned, the supply space is, in the axial direction, bounded by the turbine impeller and, on the pump impeller side, substantially by the bearing arrangement. Appropriate means are provided in the operating medium supply space for realizing a partial flow diversion to the bearing arrangement. Said means may be designed, e.g., in the form of a disk with cross-sectionally beveled inside contour. The clearance created thereby effectuates a dosing of the lubricant flow through the bearings.

The solution according to the invention is characterized by a simple structure, particularly of a simple operating medium supply with a simple duct arrangement, where an option for diverting the lubricant supply to the bearings is provided in the operating medium supply system. Expensive sealing measures are not required. Operationally, the operating medium supply takes place via rotating machine parts. Additional sealing measures are not required. In terms of manufacturing engineering, the solution according to the invention allows very easy, and thus low-cost realization. Moreover, it is characterized by easy assembly and, therefore, allows for future replacement.

The diversion of the partial flow for the bearing arrangement supporting the pump impeller also permits this partial flow to be utilized for lubrication of adjacent bearings disposed in axial direction in the area of the bearing arrangement. Simple connecting lines, or bores or openings, can be used for this purpose.

Upon heat buildup in it, the operating medium can be drained via openings in the turbine impeller and replaced by new operating medium, which is fed to the working space via the central supply line extending through the take-off shaft.

With an appropriate arrangement of the bearings and the means for dosing the partial flow, this partial flow can be kept as low as needed, percentagewise, relative to the operating medium present in the working space.

BRIEF DESCRIPTION OF THE DRAWINGS

The present invention is illustrated hereafter with the aid of figures, which show the following:

FIG. 2, another embodiment of a hydrodynamic clutch according to the present invention.

DETAILED DESCRIPTION OF THE INVENTION

Figure 1:
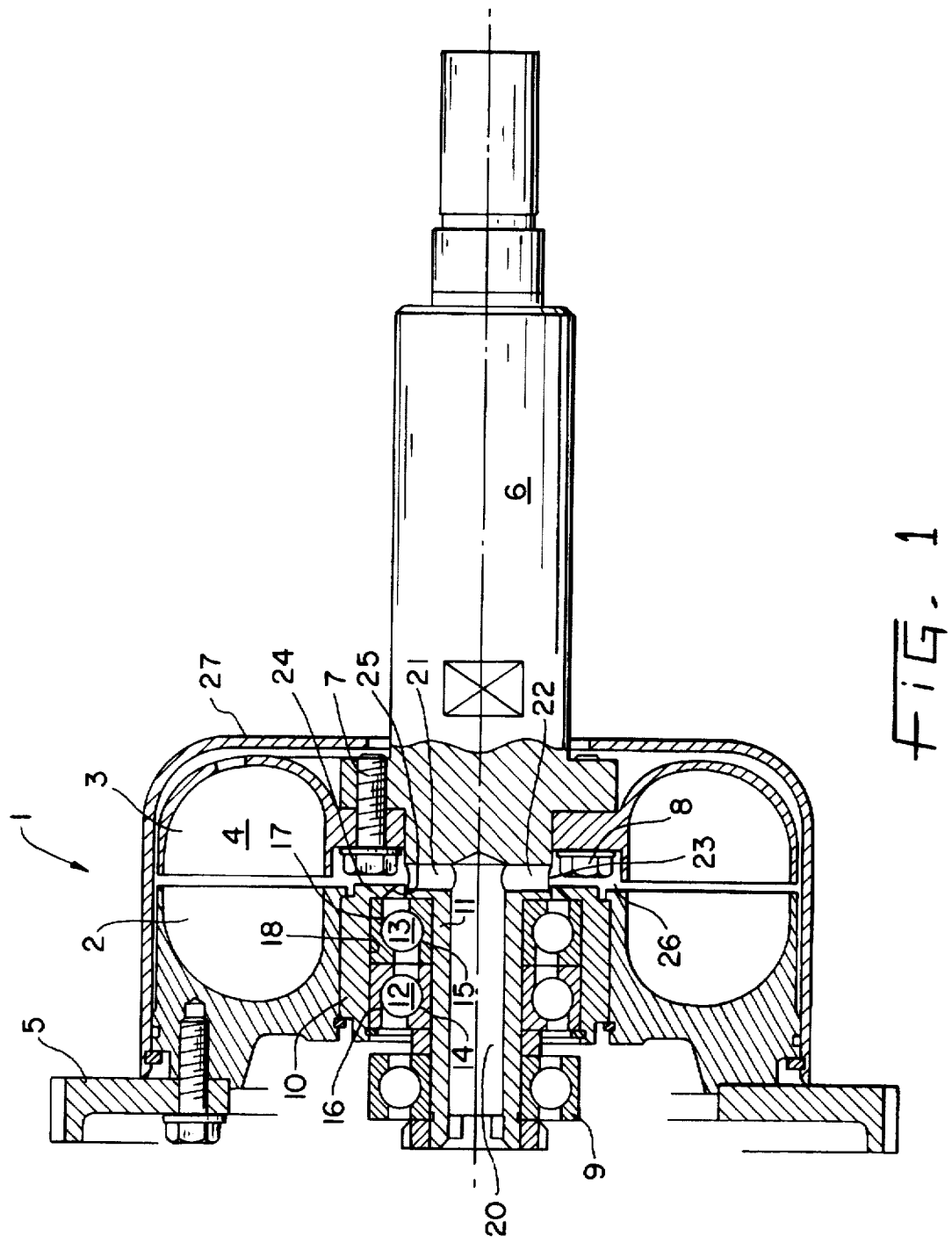
FIG. 1, a hydrodynamic clutch in a turbo compound system, with a disk forming a stripping edge in the operating medium supply space according to the present invention.

FIG. 1 illustrates a hydrodynamic clutch 1 pertaining to a power transmission. The hydrodynamic clutch 1 comprises a primary wheel described as pump impeller 2 and a secondary wheel which functions as a turbine impeller 3. Pump impeller and turbine impeller form together a toroidal working space 4 which can be filled with operating fluid, for example oil. The pump impeller is driven by a gear arranged on a shaft, not illustrated here, of a not illustrated drive turbine. The gear meshes for that purpose with a gear 5 which is torsionally fixed and coupled to the pump impeller 2.

The secondary wheel, or turbine impeller 3, is arranged on a take-off shaft 6 of the hydrodynamic clutch 1. In the illustrated exemplary embodiment, the turbine impeller 3 is coupled to the take-off shaft 6 in a torsionally fixed manner by means of positive, or form-fit, connections in the form of screw joints, presently the screw joints 7 and 8 serving as substitutes. The output transmitted by the hydrodynamic clutch 1 to the take-off shaft 6 is transmitted to a power transmission unit and contributes, in the area of the power transmission unit, to the output available on the take-off shaft of an engine not illustrated here. Moreover, the output shaft 6 supports the gear 5 via a bearing 9, which is designed, for instance, as a ball bearing, as well as the pump impeller 2 via an arrangement formed of a sleeve 10 and bearing arrangement 11. The bearing arrangement 11 comprises in the illustrated case two angular ball bearings 12, 13. These make it possible to absorb combined loads, i.e., radial and axial forces, better than deep-groove ball bearings. The pump impeller 2 bears on the sleeve 10, the angular ball bearings 12 and 13 on the take-off shaft 6. The inner races 14, 15 of the angular ball bearings 12, 13 of the bearing arrangement 11 are for that purpose fitted directly on the take-off shaft 6. The outer races 16, 17 of the angular ball bearings 12, 13 of bearing arrangement 11 bear on the inside 18 of sleeve 10. The primary impeller 2 is in contact with outside 19 of sleeve 10. To realize the torque assumption by the pump impeller and the forwarding via the operating medium to the turbine impeller 3, the rotation of pump impeller 2, sleeve 10 and outer races 16, 17 of angular ball bearings 12, 13 takes place at identical rpm. Press fits are provided for that purpose between outer races 16, 17 and sleeve 10 as well as outside 19 of sleeve 10 and pump impeller 2. The gear 5 bears analogously on the take-off shaft 6 via the bearing 9.

Oil is supplied to the working space directly via take-off shaft 6. The take-off shaft 6 features for that purpose a bore 20, which is preferably arranged coaxially with the axis of symmetry A of take-off shaft 6. Bore 20 extends from the primary side up to about a plane intersecting the center of the toroidal working space. Distributing bores 21 and 22 depart from central bore 20 and extend to the outer periphery 23 of the take-off shaft 6 in a radial direction. Central bore 20 and distributing bores 21 and 22 distribute the operating fluid to the toroidal working space 4. The oil flow for the bearing arrangement 11 is diverted at the same time. To that end, a disk 24 is arranged between pump impeller 2 and turbine impeller 3. Disk 24 has a beveled inside contour 25 serving as a stripping edge for the operating medium. The beveled inside contour extends from the supply space 26 to the outer races 16 and 17 of angular ball bearings 12, 13 of bearing arrangement 11. The two angular ball bearings 12, 13 are completely flooded. The volume of the diverted operating medium flow can be influenced by the design of disk 24. Therefore, only a central operating medium supply is required, the central operating medium supply also providing a lubricant supply. Appropriate design also provides lubricant to the bearing 9, which serves to support the gear 5 on the take-off shaft 6.

The hydrodynamic clutch 1 is enclosed by a bell-shaped housing 27. Housing 27 is preferably fashioned as a deep-drawn part and fitted on gear 5 by means of various joining options. This makes it possible to manufacture the bell-shaped housing 27 as a deep-drawn part and fasten it to the gear 5, for example, by means of welding or tack joints.

FIG. 2 illustrates an embodiment similar to FIG. 1. The pump impeller of the hydrodynamic clutch 1 bears on the take-off shaft 6 of the hydrodynamic clutch, via a bearing arrangement 11 comprising two paired angular ball bearings 12, 13. Moreover, pump impeller 2 is joined in torsionally fixed fashion to the gear 5, by screw joints 7, 8. The gear 5 bears partly on the angular ball bearing 13.

The turbine impeller 3 is coupled in torsionally fixed fashion to the take-off 6 by way of a spline 30. The supply of working space 4 with operating fluid takes place by way of a central bore 20 extending from the secondary side, i.e., on the side of the turbine impeller 3, toward the primary side, i.e., toward pump impeller 2, of the hydrodynamic clutch 1 through the take-off shaft 6. Distributing ducts 31 and 32 extend from central bore 20 in the radial direction toward the outer circumference 23 of take-off shaft 6. The arrangement of distributing ducts 31 and 32 is such that they are disposed, in the axial direction, radially interior of the pump impeller 2, notably of the operating medium supply space 26. The operating medium proceeds from the operating medium supply space 26 directly to the bearings 12 and 13 of bearing arrangement 11. In the embodiment illustrated in FIG. 2, an operating medium flow, which empties into the working space 4, is diverted for lubrication of the bearings from the operating medium space 26.

In the illustrated embodiment, further distributing ducts 33 and 34 are provided to supply a further bearing 35 with lubricant from the central bore 20. In another variant, not illustrated here, bearing 35 may be supplied with lubricant from the diverted operating medium flow from the supply space 26 which would require a connection between the bearing 13 of bearing arrangement 11 and bearing 35. The three bearings should in this case be supplied from one diverted operating medium flow.

The bell-shaped clutch housing 27 is arranged and designed so that it connects directly to the primary impeller. The bell-shaped clutch housing 27 is made as a deep-drawn part.

The structure and make of turbine impeller 3 are such that it features in its installed position a ribbing which protrudes into the operating medium supply space 26. The ribs are disposed at a certain spacing on a common diameter in the lubricant supply space.

The arrangement of the operating medium supply space 26 also enables the lubrication of the spline connection between turbine impeller 3 and take-off shaft 6.

What is claimed is:

1. A hydrodynamic clutch for a drive system, said hydrodynamic clutch comprising:

a pump impeller and a turbine impeller together defining a toroidal working space, said toroidal working space having a center plane disposed between said pump impeller and said turbine impeller;

a take-off shaft rotationally fixed to said turbine impeller;

a first bearing disposed between said pump impeller and said take-off shaft whereby said pump impeller bears on said take-off shaft;

an operating medium supply space in fluid communication with said toroidal working space and disposed radially interior of said toroidal working space, said operating medium supply space axially disposed between said first bearing and said turbine impeller;

a central operating medium supply duct disposed in said take-off shaft and extending axially within said take-off shaft to a point proximate said center plane;

a source of operating medium, said source in fluid communication with said central operating medium supply duct;

at least one distributing duct disposed within said take-off shaft and providing fluid communication between said central operating supply duct and said operating medium supply space; and a disk providing support for an outer race of said first bearing and having an axial end bordering said operating medium supply space, said axial end defining a tapered opening between said operating medium supply space and said first bearing, said opening being largest nearest said first bearing whereby fluid from said operating medium supply space is diverted to said first bearing.

2. The hydrodynamic clutch of claim 1 wherein said first bearing comprises two adjacently disposed antifriction bearings.

3. The hydrodynamic clutch of claim 2 wherein said two anti-friction bearings are angular ball bearings.

4. The hydrodynamic clutch of claim 1 further comprising a second bearing disposed between said take-off shaft and a machine part whereby said take-off shaft bears upon said machine part; and a lubricant duct providing fluid communication between said first bearing and said second bearing.

5. The hydrodynamic clutch of claim 2 further comprising a second bearing disposed between said take-off shaft and a machine part whereby said take-off shaft bears upon said machine part; and a lubricant duct providing fluid communication between said first bearing and said second bearing.

6. The hydrodynamic clutch of claim 3 further comprising a second bearing disposed between said take-off shaft and a machine part whereby said take-off shaft bears upon said machine part; and a lubricant duct providing fluid communication between said first bearing and said second bearing.

* * * * *